Patented Apr. 27, 1926.

1,582,318

UNITED STATES PATENT OFFICE.

WALTER VAN DE MARK, OF NORTH CHICAGO, ILLINOIS, ASSIGNOR TO VULCAN LOUISVILLE SMELTING COMPANY, A CORPORATION OF ILLINOIS.

COLORED GRANULATED SLAG AND METHOD OF MAKING SAME.

No Drawing. Application filed May 23, 1924, Serial No. 715,463. Renewed February 25, 1926.

*To all whom it may concern:*

Be it known that I, WALTER VAN DE MARK, a citizen of the United States, residing at North Chicago, county of Lake, State of Illinois, have invented a certain new and useful Improvement in Colored Granulated Slag and Methods of Making Same, and declare the following to be a full, clear, and exact description of the same, such as will enable others skilled in the art to which it pertains to make and use the same.

In the smelting of brass there is left a residue that has heretofore been considered of no value after the removal therefrom of all the metal that it has been commercially practicable to extract and such residues have therefore been disposed of as waste material. The object of the present invention or discovery is to render such residues and similar residues or slags useful.

Considered only from the mechanical standpoint, such residues or slag from copper smelters, may be transformed into an efficient covering material for roofing felt in the form of sheets or shingles in lieu of the crushed or granulated rock, slate or other materials now employed. Such a material, however, must be of one or more of the colors suitable for roofing material before it becomes a commercial possibility. Considered in one of its aspects my invention or discovery may be said to have for its object to produce from waste products of the kind to which reference has been made an efficient covering material of roofing felt that shall also possess a color adapted to such use.

The residue or slag contains silica, iron, and usually aluminum, zinc and other chemical elements and, if granulated by dropping it in a hot state into water, it may possess properties that are useful when only the mechanical standpoint is considered; but it will not have such a color as is needed in a roofing material. If the slag, mixed with calcium in the form of lime or lime rock is smelted in a reducing furnace, the iron will be separated out and may be recovered, while the zinc will disappear in vapor form. If all of the iron is removed a more or less clear or colorless slag, composed mainly of calcium and aluminum silicates, remains; and upon pouring this slag into water it hardens in a granulated form. When a small amount of iron is left in the slag, a ferrous silicate is formed and gives to the product a green color. The shade of the color varies with the amount of calcium employed in the process. If the lime or lime rock is equal to about twenty percent, by weight, of the slag, the color will be a dark green; whereas when the amount of lime or lime rock is increased to fifty or sixty percent, an emerald green results.

If it is desired to remove all of the iron the temperature during smelting is increased and more coke is used. The desired color may then be obtained by adding oxides of the proper metals. Thus, for example; cobalt will produce blue and copper will give a red color.

It will thus be seen that I am able to transform something that has hertofore been a waste material into a valuable commercial product.

I claim:

1. The process of producing a granulated material suitable for covering roofing felt, which consists in smelting the residue of brass or copper smelting furnaces mixed with a compound of calcium to reduce the iron content, and pouring the molten mass into water.

2. The process of producing a granulated material suitable for covering roofing felt, which consists in adding lime or lime rock to residue from a brass or copper smelter, smelting the mixture in a smelting furnace to reduce the iron content, and pouring the molten mass with water.

3. The process of producing a granulated green-colored material suitable for covering roofing felt, which consists in mixing lime or lime rock with an iron-containing residue from a brass or copper smelter, smelting the mixture until the iron content is reduced to about 2%, and then pouring the molten mixture into water.

4. The process of producing a granulated colored material suitable for covering roofing felt, which consists in adding lime or lime rock to a residue from a brass or copper smelter, smelting the mixture in a smelting furnace to reduce the iron content, causing a silicate of the proper metal to give the desired color to be formed in the molten mass, and then pouring the molten mass into water.

5. The process of producing a granulated green-colored material suitable for covering roofing felt, which consists in adding from 20% to 60% by weight of lime or lime rock to an iron-containing residue from a brass or copper smelter, smelting the mixture in a smelting furnace until the iron content is reduced to about 2%, and then pouring the molten mass into water.

In testimony whereof I sign this specification.

WALTER VAN DE MARK.